(12) United States Patent
Chuang

(10) Patent No.: US 12,705,313 B2
(45) Date of Patent: Aug. 11, 2026

(54) DIGITAL CONTENT AUTHORIZATION MANAGEMENT SYSTEM AND METHOD FOR USING THE SAME

(71) Applicant: Lien Hao Chuang, Kaohsiung (TW)

(72) Inventor: Lien Hao Chuang, Kaohsiung (TW)

( * ) Notice: Subject to any disclaimer, the term of this patent is extended or adjusted under 35 U.S.C. 154(b) by 88 days.

(21) Appl. No.: 18/950,674

(22) Filed: Nov. 18, 2024

(65) Prior Publication Data

US 2025/0252161 A1 Aug. 7, 2025

(30) Foreign Application Priority Data

Feb. 7, 2024 (TW) ................................ 113105167
Jul. 3, 2024 (TW) ................................ 113124869

(51) Int. Cl.
*G06F 21/10* (2013.01)
*H04W 4/80* (2018.01)

(52) U.S. Cl.
CPC ........ *G06F 21/1062* (2023.08); *G06F 21/107* (2023.08); *H04W 4/80* (2018.02)

(58) Field of Classification Search
CPC .. G06F 21/106; G06F 21/107; G06F 21/1062; G06F 21/1077; G06F 21/46; H04W 4/80; G06K 7/10237; G06K 7/10297
See application file for complete search history.

(56) References Cited

U.S. PATENT DOCUMENTS 7,522,879 B2 * 4/2009 Matsuo .............. G06K 7/10237 455/73
9,143,940 B2 * 9/2015 Fukushima ........... H04W 12/50
12,184,758 B2 * 12/2024 Feola ................... G06Q 20/389
2007/0197261 A1 * 8/2007 Humbel .............. H04L 63/0853 455/558
2014/0358780 A1 * 12/2014 Fujioka .................. G06Q 20/40 726/19
2020/0021864 A1 * 1/2020 Weitendorf .......... G06Q 20/123
2026/0075043 A1 * 3/2026 Durya ................. H04L 63/0428

* cited by examiner

*Primary Examiner* — Mohammad A Siddiqi
(74) *Attorney, Agent, or Firm* — MUNCY, GEISSLER, OLDS & LOWE, P.C.

(57) ABSTRACT

A digital content authorization management system and a method for using the same are provided for controlling a legal granting and use of a copyright of a digital content. Mainly, after storing the digital content on a server using a first user-end information device, an authorization rule is established for the digital content, and an authorization code is set and corresponded to an identification code of a near-field communication (NFC) tag. In this way, the server unifies management of the legally authorized digital content. When the NFC tag is circulated externally, one who obtains the NFC tag can use a second communication device to sense the NFC tag, perform and pass an identification and verification process, and then obtain a right to read the digital content.

13 Claims, 15 Drawing Sheets

DIGITAL CONTENT AUTHORIZATION MANAGEMENT SYSTEM AND METHOD FOR USING THE SAME

CROSS-REFERENCE TO RELATED APPLICATIONS

The present disclosure claims priority to a Taiwan Patent Application No. 113124869 filed on Jul. 3, 2024, the disclosure of which is incorporated in its entirety by reference herein.

BACKGROUND OF THE DISCLOSURE

Field of the Disclosure

The present disclosure particularly relates to a digital content authorization management system and a method for using the same, which use near-field communication (NFC) technology to allow dividing digital contents based on whether each digital content is authorized, and allow performing identification and verification on an authorized digital content, thereby distinguishing whether the digital content is authorized, and further allowing different users to read or write the digital contents.

Brief Description of Related Art

In a field of creators, for example, when artists or groups publish songs or creations, a specific practice is to record the songs, burn them onto digital versatile discs (DVDs), and package them into limited-edition albums or box sets for consumers to purchase. With an advent of a digital era, most creators have switched to digital rights management (DRM) technology to control their authorized creations. These creations are usually protected by intellectual property rights (IP rights for short), including rights related to reproduction and adaptation. On this basis, their creations are uploaded to digital platforms such as Microsoft, Sony, Netflix, and Steam for digital sales through subscription or one-time purchase models. However, relying solely on DRM technology for digital marketing leads to limitations such as one-device-one-license experience restrictions, cross-platform compatibility issues, and platform service discontinuation risks. These limitations may not pose significant inconvenience for personal use. However, when they are intended to be used as a medium or target for widespread circulation and marketing, there are clearly implementation problems.

SUMMARY OF THE DISCLOSURE

In response to the aforementioned problems, a main object of the present disclosure is to provide a digital content authorization management system and a method for using the same, which use near-field communication (NFC) technology to manage an authorized digital content through an authorization rule and an authorization code. A user is required to undergo identification and verification prior to reading the digital content. After the identification and verification are completed, the legally authorized digital content can be read and used. Other users are allowed to differentiate and store a plurality of digital contents with different attributes.

To this end, the system of the present disclosure consists essentially of a first user-end information device, a server, an NFC tag, and a second user-end information device. The NFC tag can be sensed by the second user-end information device which is subsequently informationally connected to the server. The server uses an authorization code management module to generate an authorization code corresponding to a digital content, and an identification code, which serve as a basis for determining whether the digital content is authorized. Additionally, an authorization verification module is used to perform identification for the identification code, perform verification for an authorization rule, and then obtain the corresponding authorization code which is paired with the identification code for verification, thereby determining whether the digital content is legally authorized. Moreover, in the present disclosure, another digital content can be added by a different user. Users are allowed to differentiate a plurality of digital contents according to their needs and store the digital contents in an original authorization data storage area, a first data storage area and a second data storage area in a media information database, respectively. In this way, an authorized user can perform a sensing operation and read the digital contents through his/her information device.

DETAILED DESCRIPTION OF PREFERRED EMBODIMENTS

Figure 1:
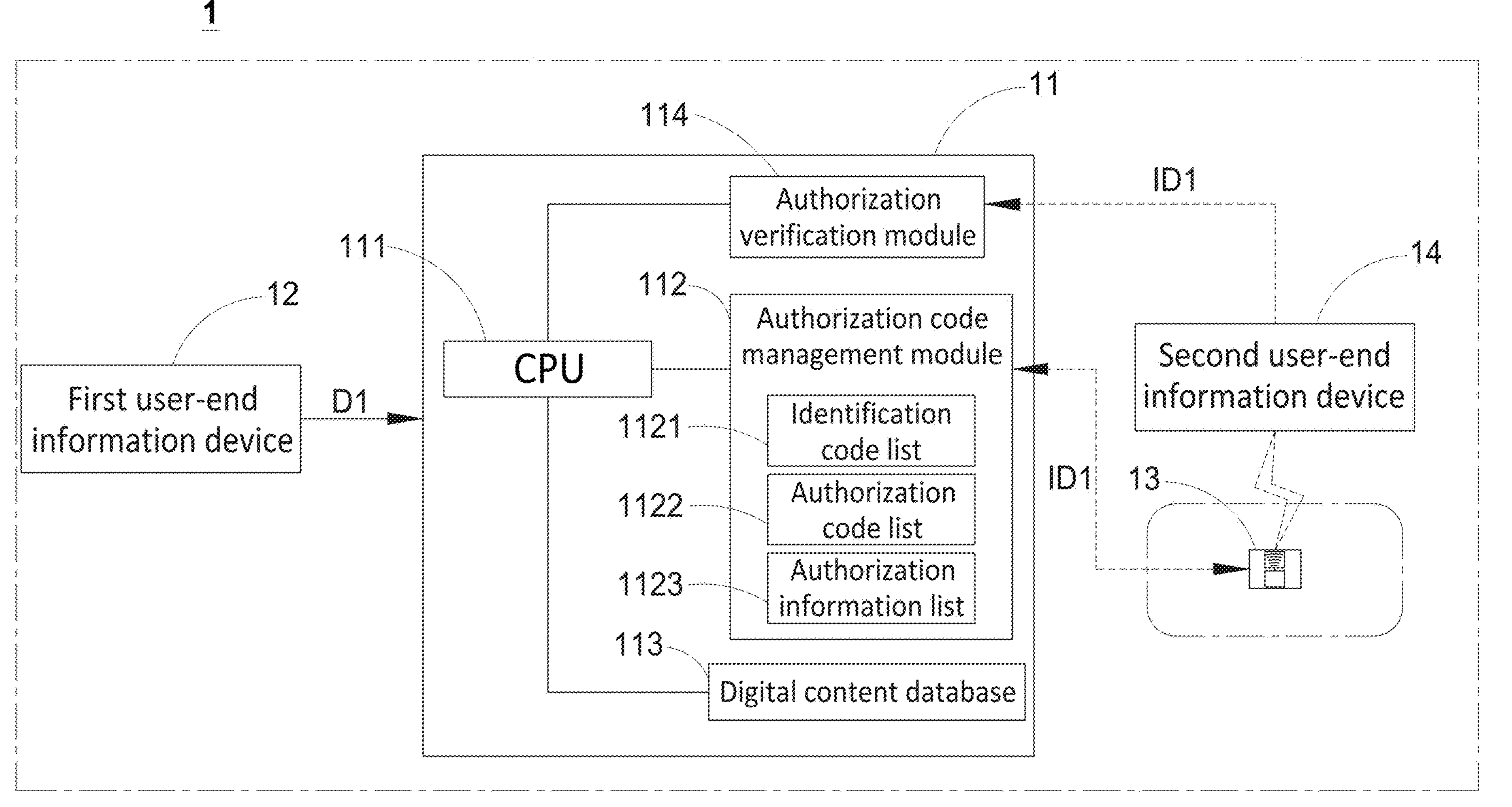
FIG. 1 is a schematic diagram of a system architecture according to the present disclosure.

Referring to FIG. 1, a digital content authorization management system 1 of the present disclosure consists essentially of a server 11, a first user-end information device 12, a near-field communication (NFC) tag 13, and a second user-end information device 14.

1. The server 11 has a central processing unit (CPU) 111 capable of performing logical operations. The CPU is informationally connected to an authorization code management module 112, a digital content database 113, and an authorization verification module 114.

(1) The authorization code management module 112 stores an identification code list 1121, an authorization code list 1122, and an authorization information list 1123. A plurality of identification codes are recorded in the identification code list 1121. A plurality of authorization codes C are recorded in the authorization code list 1122. A plurality of authorization rules are recorded in the authorization information list 1123. The authorization rules are mainly, for example, a plurality of conditions for authorization.

(2) The digital content database 113 stores a plurality of digital contents. Each digital content is any one of the following or a combination thereof: text, image, video, or audio. The digital contents are stored in a form of a file.

(3) The authorization verification module 114 is configured to verify validity for an authorization rule and an authorization code C and grant a read (or playback) permission for one of the digital contents when a verification result is positive (valid).

2. The first user-end information device 12 is an information device capable of editing, storing, and transmitting the one of the digital contents. The first user-end information device 12 is, for example, any one of the following: a desktop computer, a tablet, a laptop, or a mobile device, but the present disclosure is not limited thereto. The first user-end information device 12 is configured to edit a digital content and transmit the digital content to the server 11 for storage.

3. The NFC tag 13 is a miniaturized carrier for a contactless chip, which can be attached or embedded as a label in a physical object or other items (e.g., a gift). The NFC tag 13 uses wireless communication technology for data transmission and access. Specifically, the NFC tag 13 employs a combination of radio-frequency identification (RFID) technology and NFC technology, enabling contactless communication between two different electronic devices, both equipped with NFC functionality, in a peer-to-peer (P2P) mode to achieve data transmission and access.

4. The second user-end information device 14, such as a mobile device equipped with NFC functionality, can be used to perform near-field sensing on the NFC tag 13 to obtain an identification code or an authorization rule stored or written on the NFC tag 13. The authorization rule can be information such as a data type of a digital content, an authorized region, or a validity period of authorization.

Additionally, the first user-end information device 12 can be informationally connected to the server 11 for transmitting and storing an edited digital content D1 into the digital content database 113 of the server 11. The authorization code management module 112 can store an established authorization rule R1 for the digital content D1 in the authorization information list 1123, and generate an associated authorization code C for them (refer to FIG. 2). Moreover, the digital content D1, the authorization rule R1, and the authorization code C are collectively assigned to an identification code ID1 for pairing of the NFC tag 13. Furthermore, the NFC tag 13 can be sensed by the second user-end information device 14 through NFC to obtain the identification code ID1, which is transmitted back to the server 11 for identification and verification to be performed by the authorization verification module 114.

Figure 2:
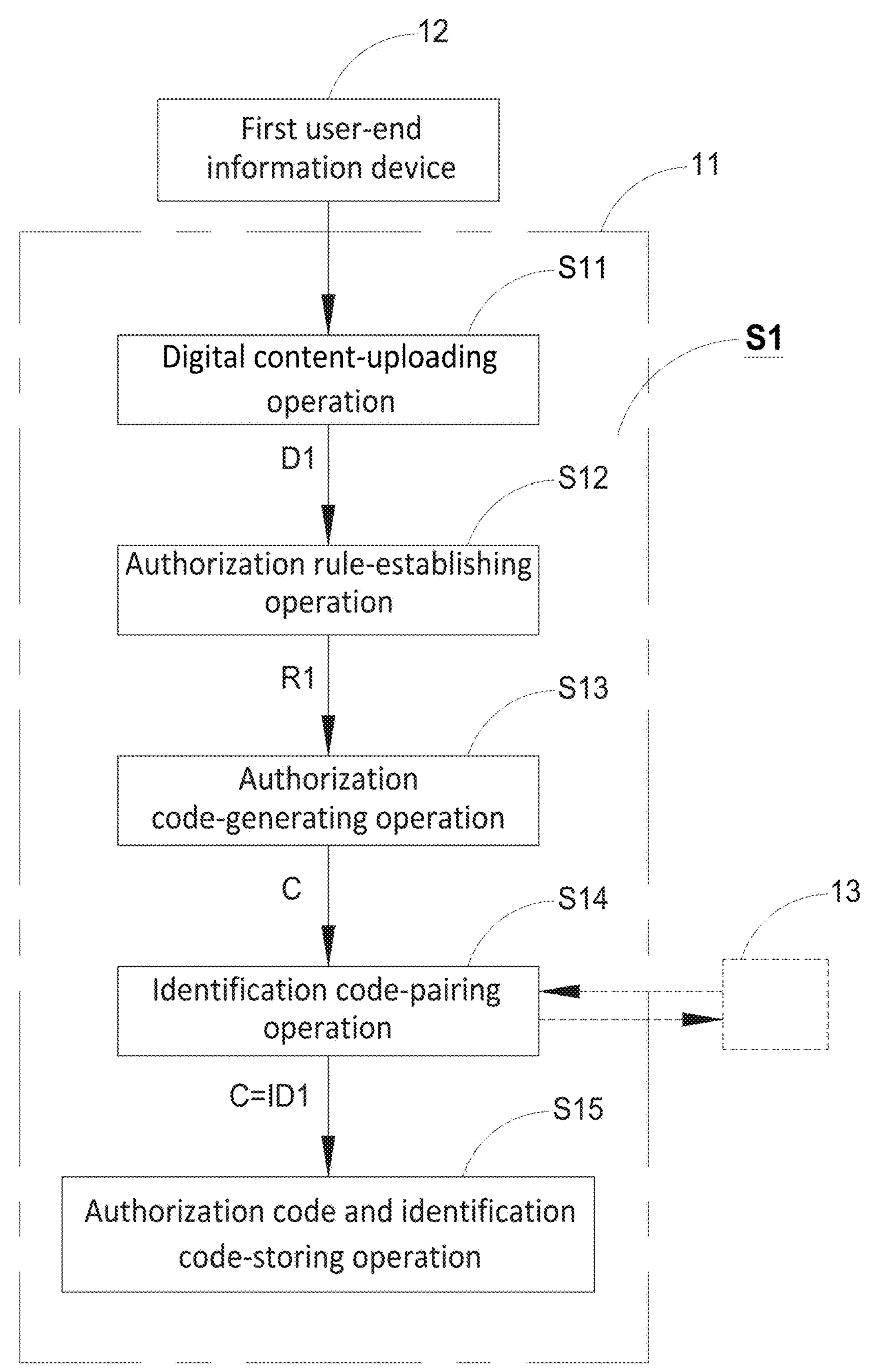
FIG. 2 is a schematic execution flowchart (1) according to the present disclosure.
Figure 3:
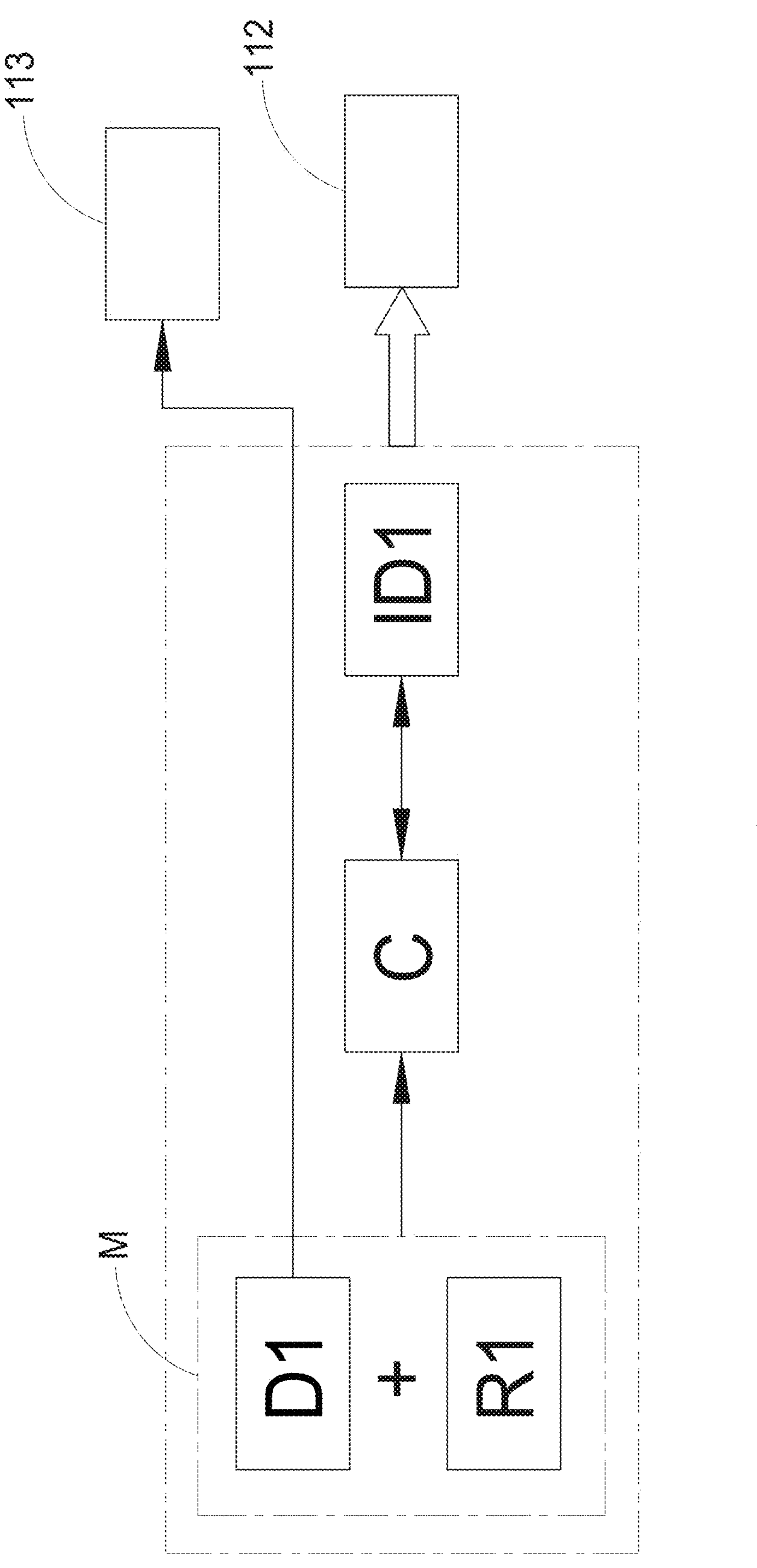
FIG. 3 is a schematic execution flowchart (2) according to the present disclosure.

Referring to FIG. 2, which illustrates a content-uploading process S1 for explaining how the first user-end information device 12 uploads and stores a digital content DI on the server 11 in the present disclosure. Referring also to FIG. 3, when the first user-end information device 12 completes editing a digital content DI (refer to FIG. 1), the following operations are performed:

(1) A digital content-uploading operation S11: The first user-end information device 12 uploads the digital content D1 to the server 11.

(2) An authorization rule-establishing operation S12: An authorization rule R1 for the digital content D1 is defined via an operation interface provided by the server 11, or directly via an operation interface of the first user-end information device 12. The authorization rule R1 can be, for example, an authorized user account, an authorization period, or an authorized type of use (e.g., the digital content D1 can be authorized for any one of the following or a combination thereof: reproduction, modification, read-only access).

(3) An authorization code-generating operation S13: Following the above, after the definition of the authorization rule R1 is completed, the authorization management module 112 of the server 11 generates an authorization code C, creates a package including the digital content D1 and the authorization rule R1, and associates the package informationally with the authorization code C. That is, the authorization code C corresponds to the digital content D1 and the authorization rule R1.

Figure 4:
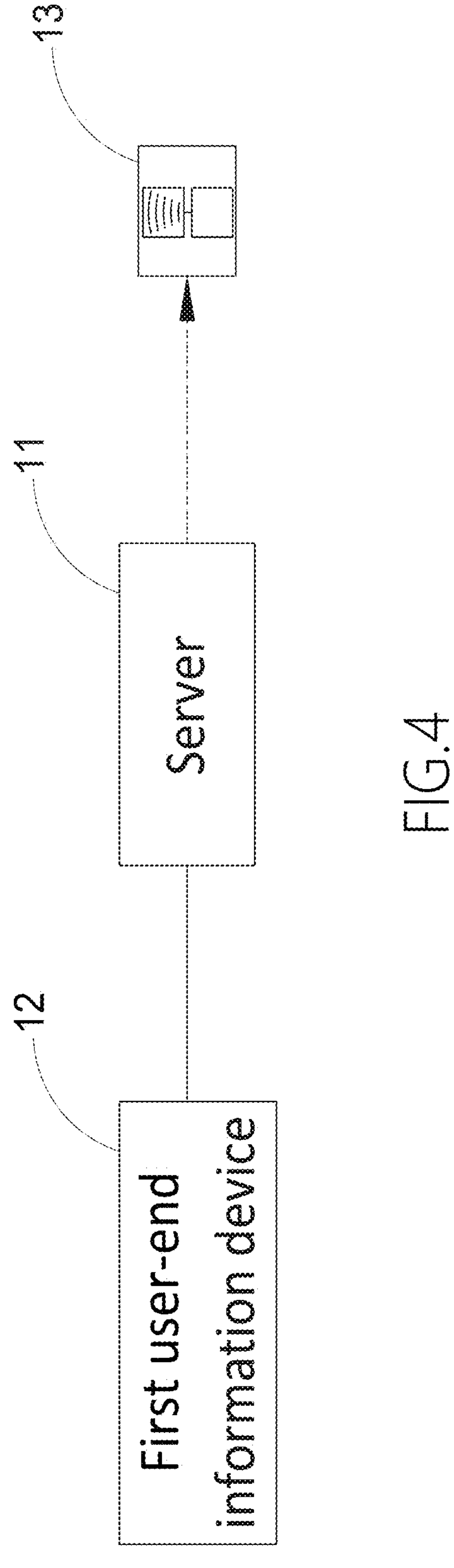
FIG. 4 is a schematic execution flowchart (3) according to the present disclosure.

(4) An identification code-pairing operation S14: Referring to FIG. 4, the server 11 subsequently pairs the authorization code C with an identification code ID1. The identification code ID1 is unique and is recorded or written into the NFC tag 13. In another embodiment, a unique identification code ID1 of an NFC tag 13 is recorded or stored in the identification code list 1121 of the server 11. The identification code ID1 and the authorization code C are paired to complete correspondence with each other. Furthermore, after the pairing is completed, the digital content D1 is stored in the digital content database 113, the authorization code C is stored in the authorization code list 1122, and the NFC tag 13 is released for use by another user.

(5) An authorization code and identification code-storing operation S15: Following the above, the identification code ID1 which has been paired is stored in the identification code list 1121, and the authorization rule R1 is stored in the authorization information list 1123.

Upon completion of the above operations, the digital content D1 is assigned a file name (e.g., the file name "MTV01") and then stored as a file M in the digital content database 113. Furthermore, the file name can be defined by an operator or automatically by the system. Accordingly, the first user-end information device 12 completes setting of authorization and a storage operation (also referred to as "publishing") for the digital content D1.

Figure 5:
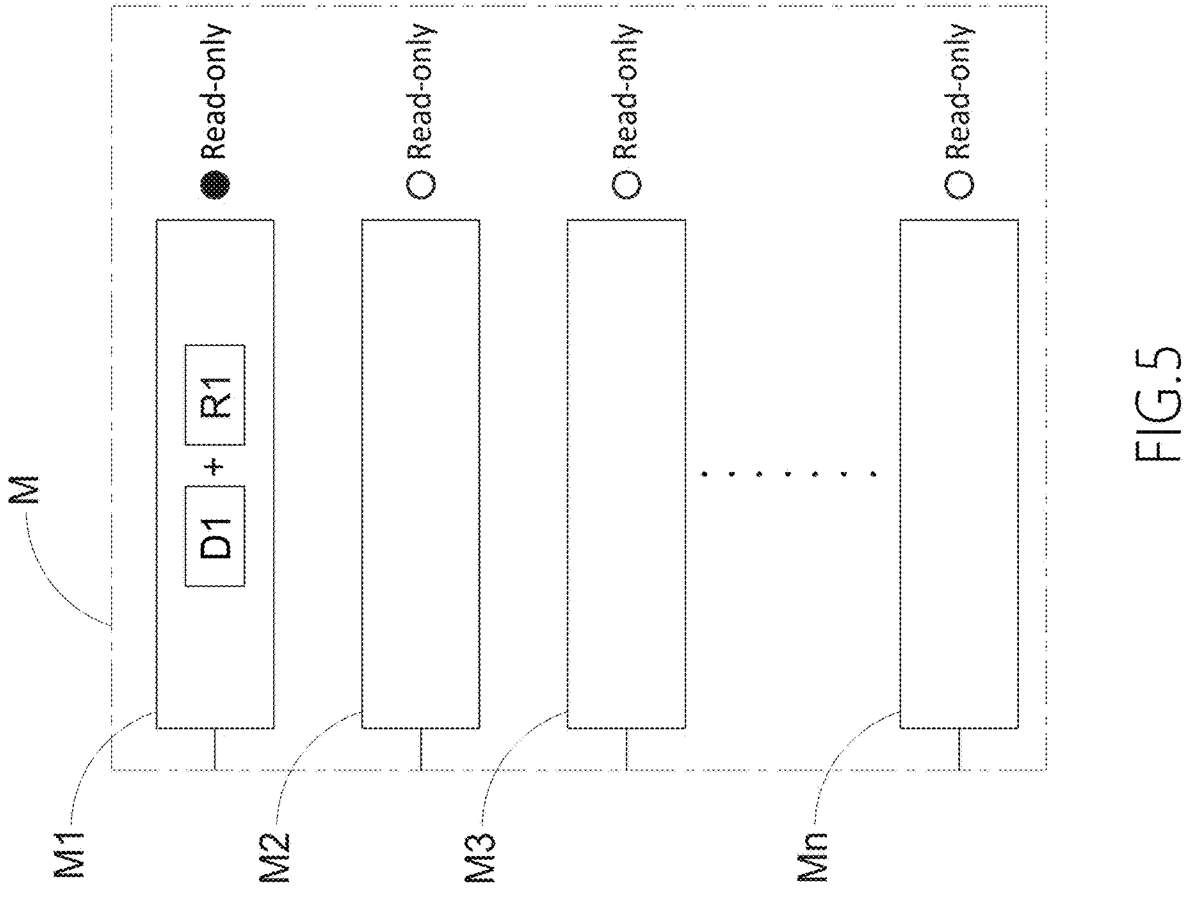
FIG. 5 is a schematic execution flowchart (4) according to the present disclosure.

Following the above, referring to FIG. 5, when the digital content D1 is stored in the digital content database 113, the first user-end information device 12 is operative to define an authorized use status of the digital content D1 as "read-only" according to an authorization status so that when used, the digital content D1 can only be read but cannot be modified. Additionally, after the definition of the authorized use status is completed, the digital content D1 and the corresponding authorization code C are stored in the digital content database 113 in a form of the file M. The file M can have a plurality of data storage areas. In an embodiment of the present disclosure, the file M has at least an original authorization data storage area M1, a second data storage area M2, a third data storage area M3, up to the nth data storage area, allowing other users to subsequently store new digital contents. Moreover, each data storage area (M1, M2, . . . , or Mn) can be independently set as "read-only".

Figure 6:
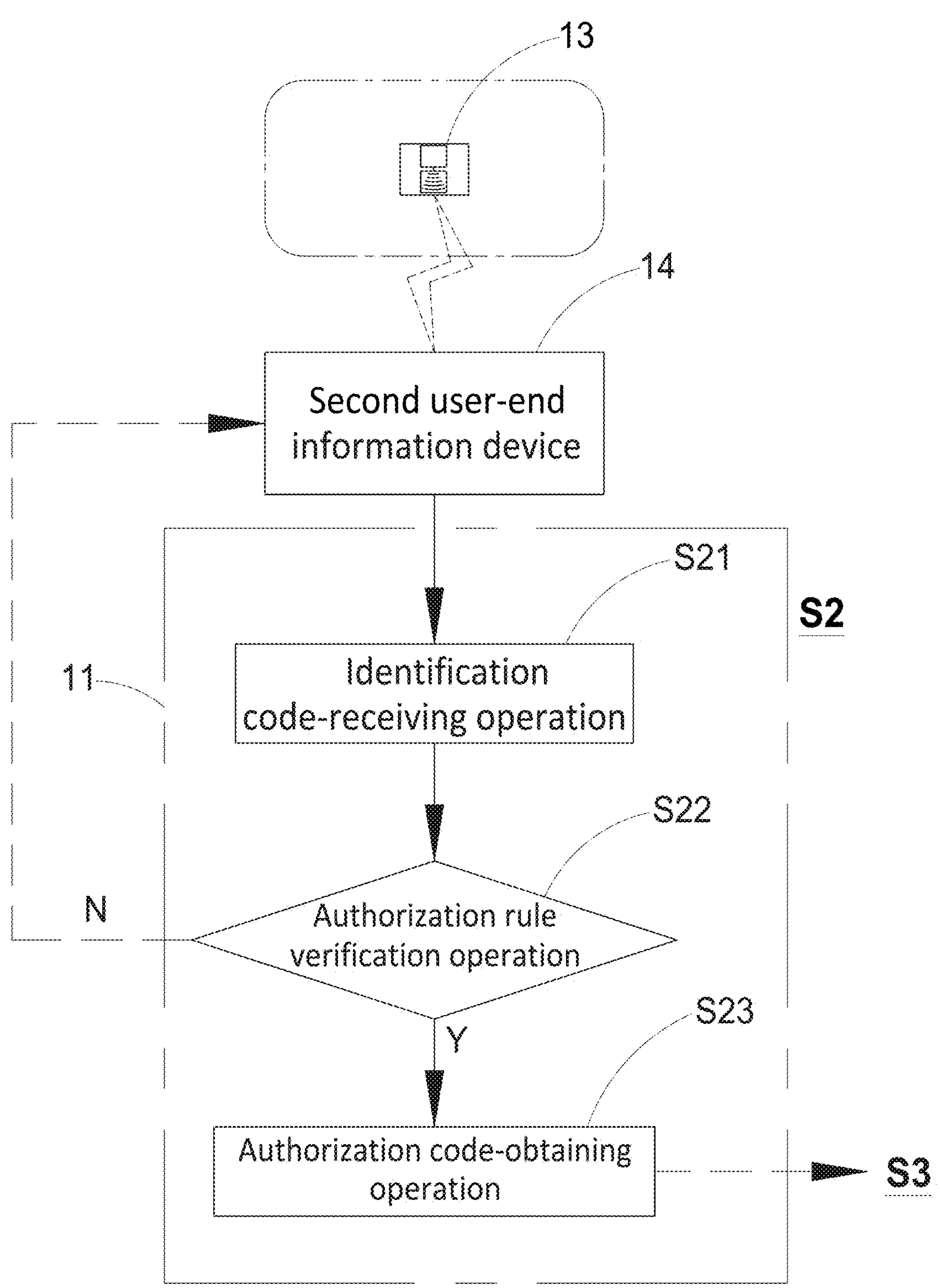
FIG. 6 is a schematic execution flowchart (5) according to the present disclosure.

Following the above, referring to FIG. 6, when another user intends to read the authorized digital content D1, the another user causes a second user-end information device 14 to activate a near-field sensing mode and sense the NFC tag 13 to enter an identification and verification process S2, as illustrated in the figure:

(1) An identification code-receiving operation S21: After the second user-end information device 14 reads the identification code ID1 of the NFC tag 13 through near-field sensing, the identification code ID1 is uploaded to and received by the server 11.

(2) An authorization rule verification operation S22: After the server 11 receives the identification code ID1, the server 11 uses the identification code ID1 as a basis to check whether the identification code ID1 is pre-registered and stored in the identification code list 1121 of the authorization management module 112, and if so, the server 11 further performs verification for the authorization rule R1. The authorization rule R1 can mainly be, for example, whether the authorized user account and the identification code ID1 match pre-registered records. The authorization rule R1 can further include, for example, the authorization period, or the authorized type of use (e.g., the digital content D1 can be authorized for any one of the following or a combination thereof: reproduction, modification, read-only access).

(3) An authorization code-obtaining operation S23: Following the above, when a verification result for the authorization rule R1 is "Y" (i.e., correct), the server 11 searches for and retrieves the authorization code C corresponding to the identification code ID1 from the authorization code list 1122, and enters an authorization process S3. When a verification result is "N" (i.e., incorrect), the server 11 sends a message to notify the second user-end information device 14.

Figure 7:
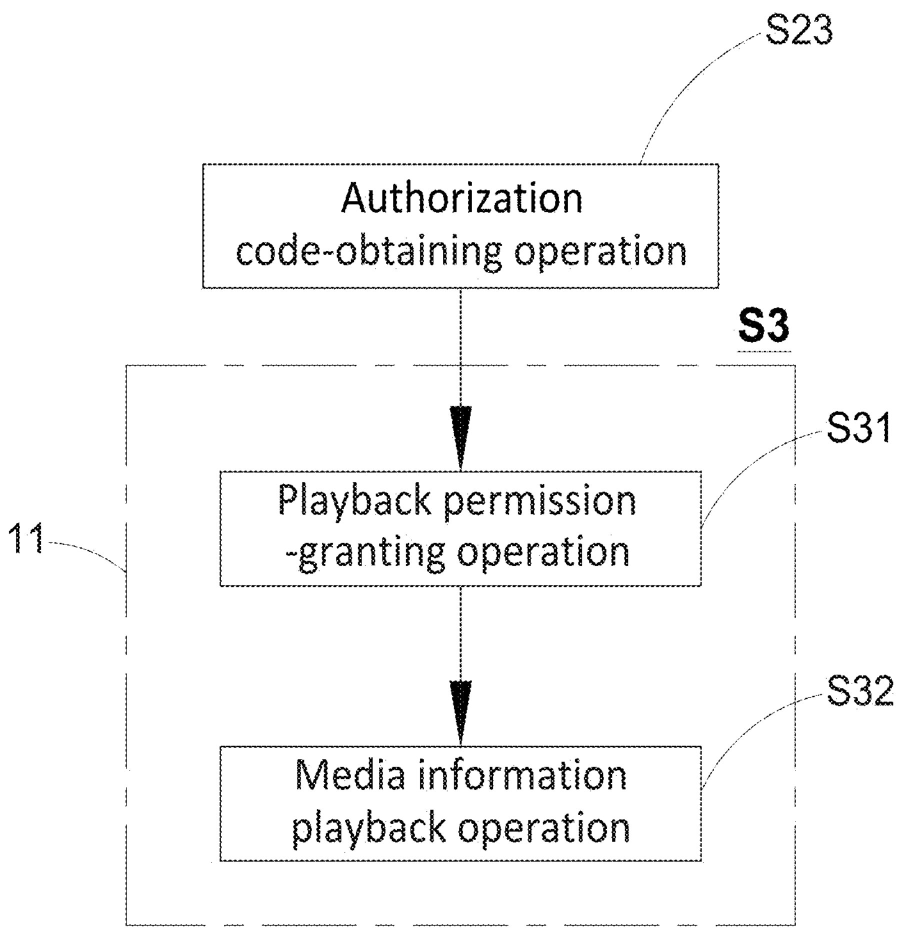
FIG. 7 is a schematic execution flowchart (6) according to the present disclosure.

Referring to FIG. 7, after the authorization code-obtaining operation S23 is completed, the authorization process S3 is initiated, and the server 11 performs a playback permission-granting operation S31. Accordingly, the second user-end information device 14 can perform a media information playback operation S32 and can view the digital content D1 through playback.

Figure 8:
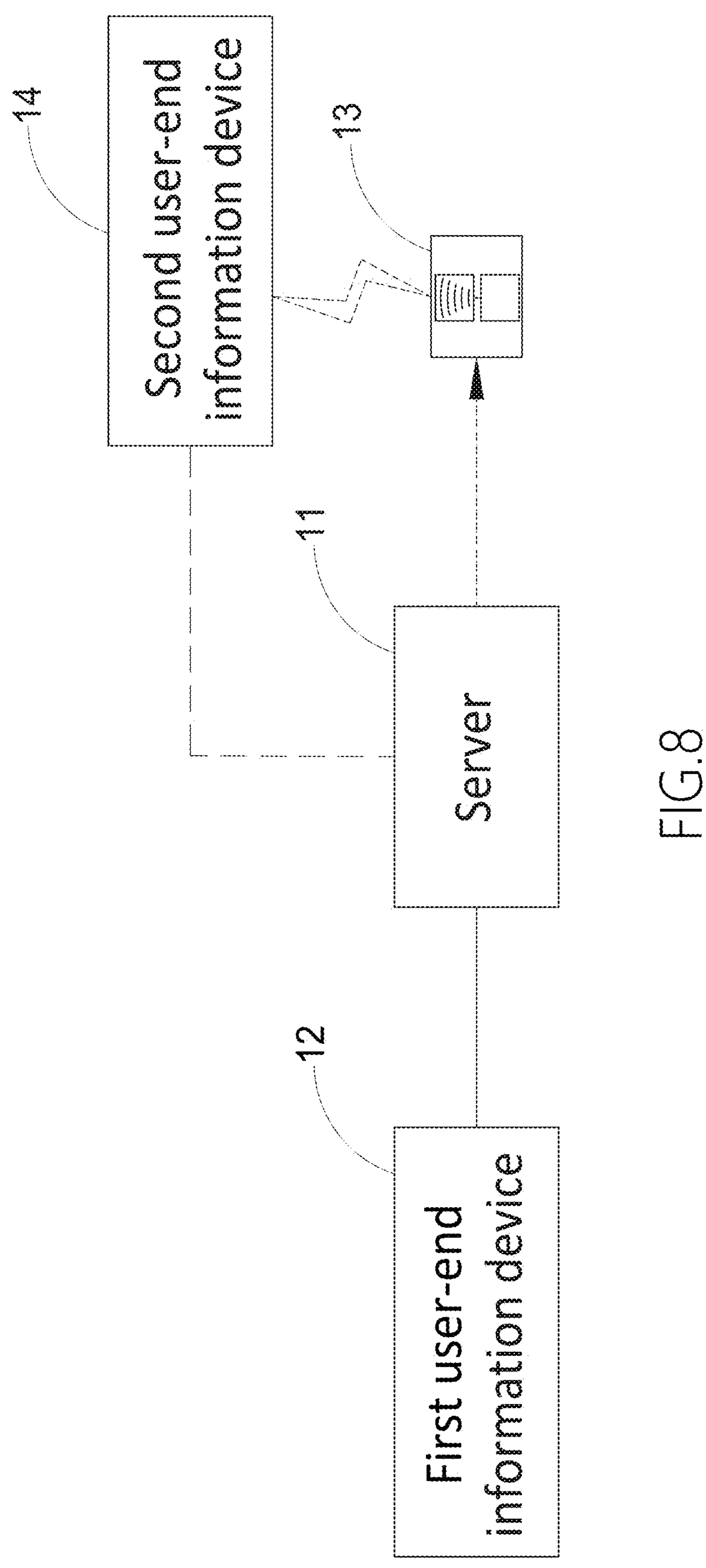
FIG. 8 is a schematic diagram (1) illustrating an execution scenario according to the present disclosure.

Referring to FIG. 8, a creation publisher (i.e., a creator) uses a first user-end information device 12 to upload a created content (i.e., the digital content D1) to the server 11. Upon completion of the operations illustrated in FIG. 2 and FIG. 3, the server 11 is linked to the identification code ID1 corresponding to an NFC tag 13, and the NFC tag 13 enters circulation in a consumer market. After a consumer obtains the NFC tag 13 (e.g., through purchase), the consumer can use a second user-end information device 14 to sense the NFC tag 13, and then cause operations illustrated in FIG. 6 to be executed. After passing the identification and verification process S2 (i.e., being identified as "legally authorized"), the digital content D1 can be viewed through playback.

Figure 9:
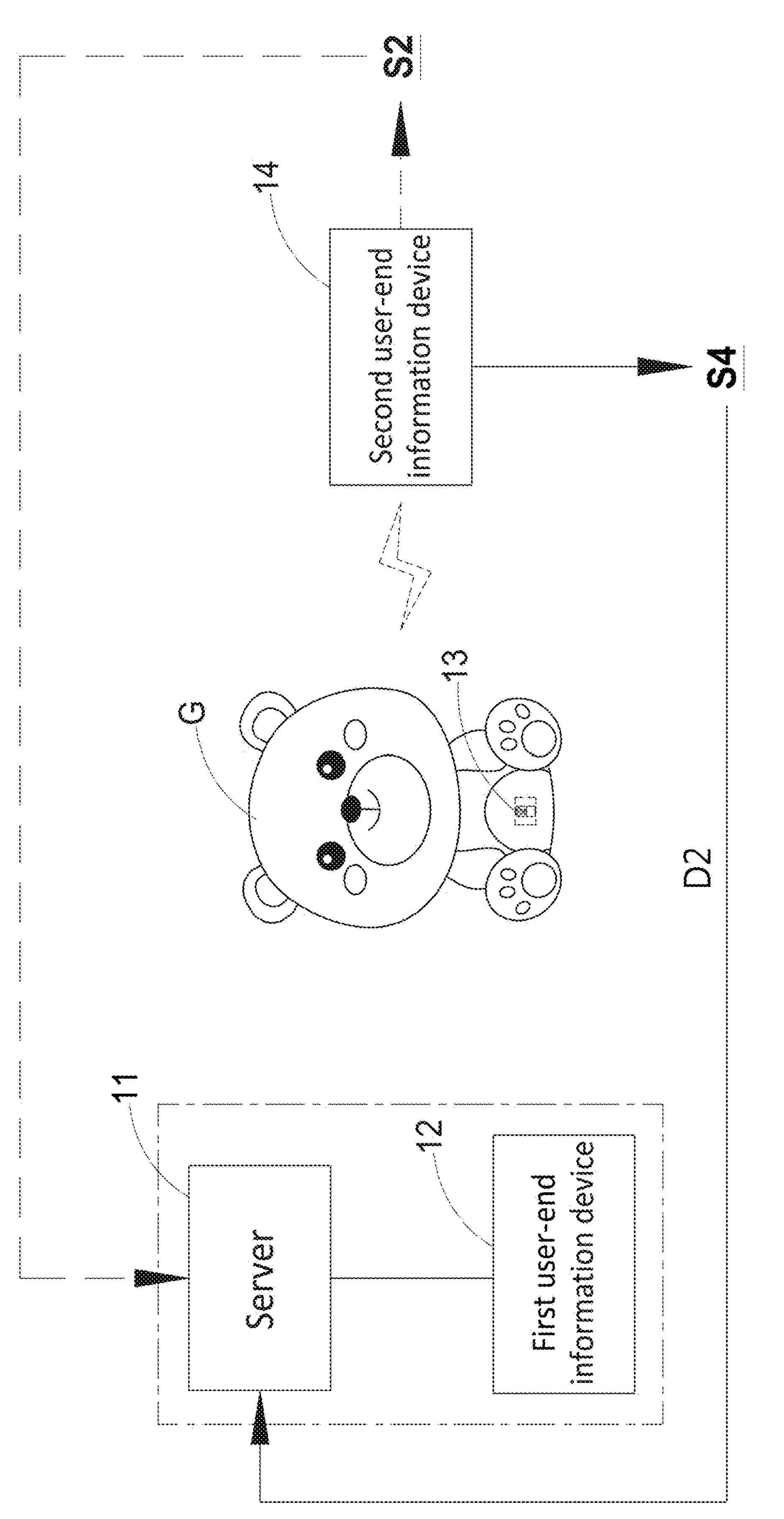
FIG. 9 is a diagram of another preferred embodiment (1) according to the present disclosure.

Referring to FIG. 9, a holder of the second user-end information device 14 can, for example, be an agent. After purchasing a plurality of NFC tags 13 from a holder of the first user-end information device 12 (i.e., a copyright owner), the agent can first use the second user-end information device 14 to read each NFC tag 13 through near-field sensing and pass the identification and verification process S2. Subsequently, the agent can use the second user-end information device 14 to perform, on the corresponding file M, an editing and uploading process S4 for a new content to write a new digital content D2. The digital content D2 can, for example, be an advertisement for a content of a service provided by the agent. The advertisement is any one of the following or a combination thereof: text, image, or audiovisual media.

Figure 10:
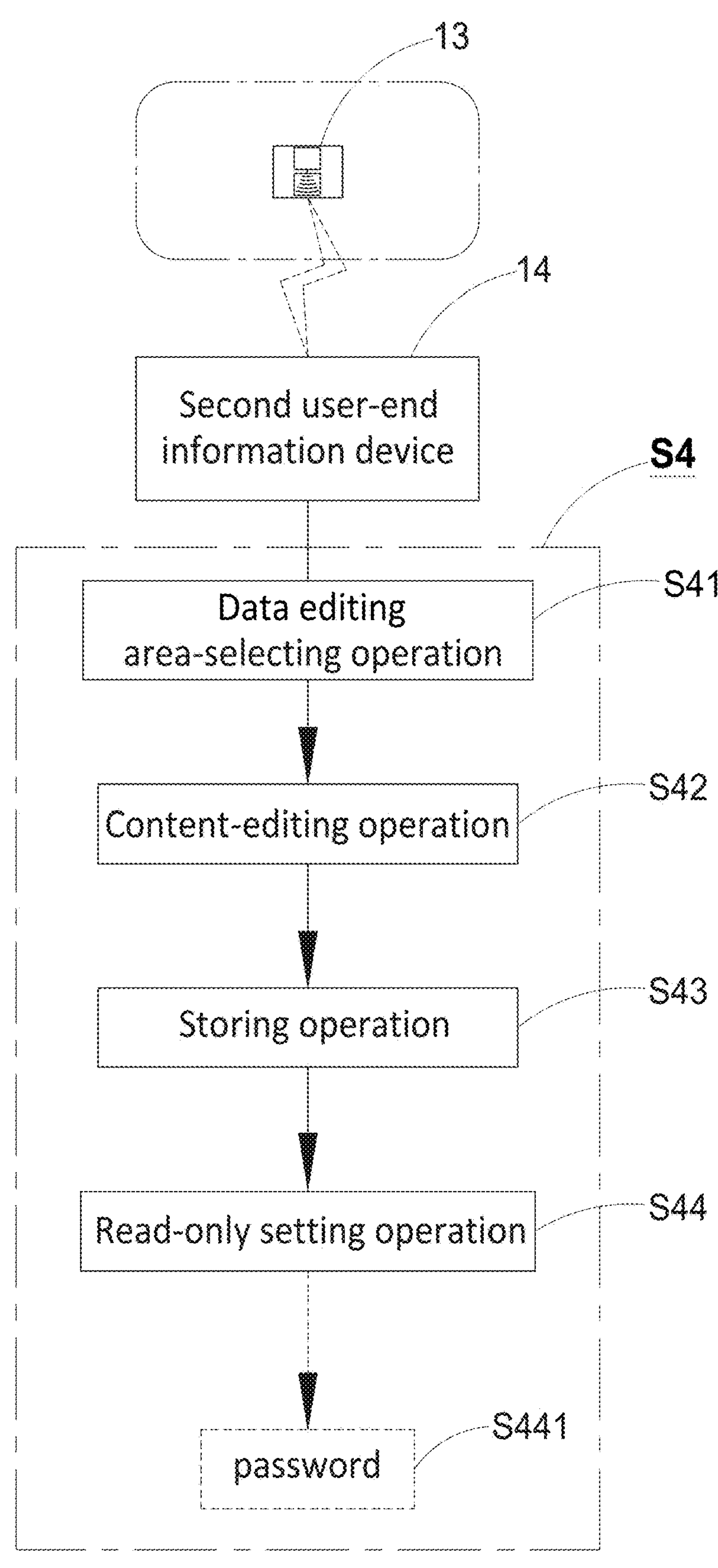
FIG. 10 is a diagram of another preferred embodiment (2) according to the present disclosure.
Figure 11:
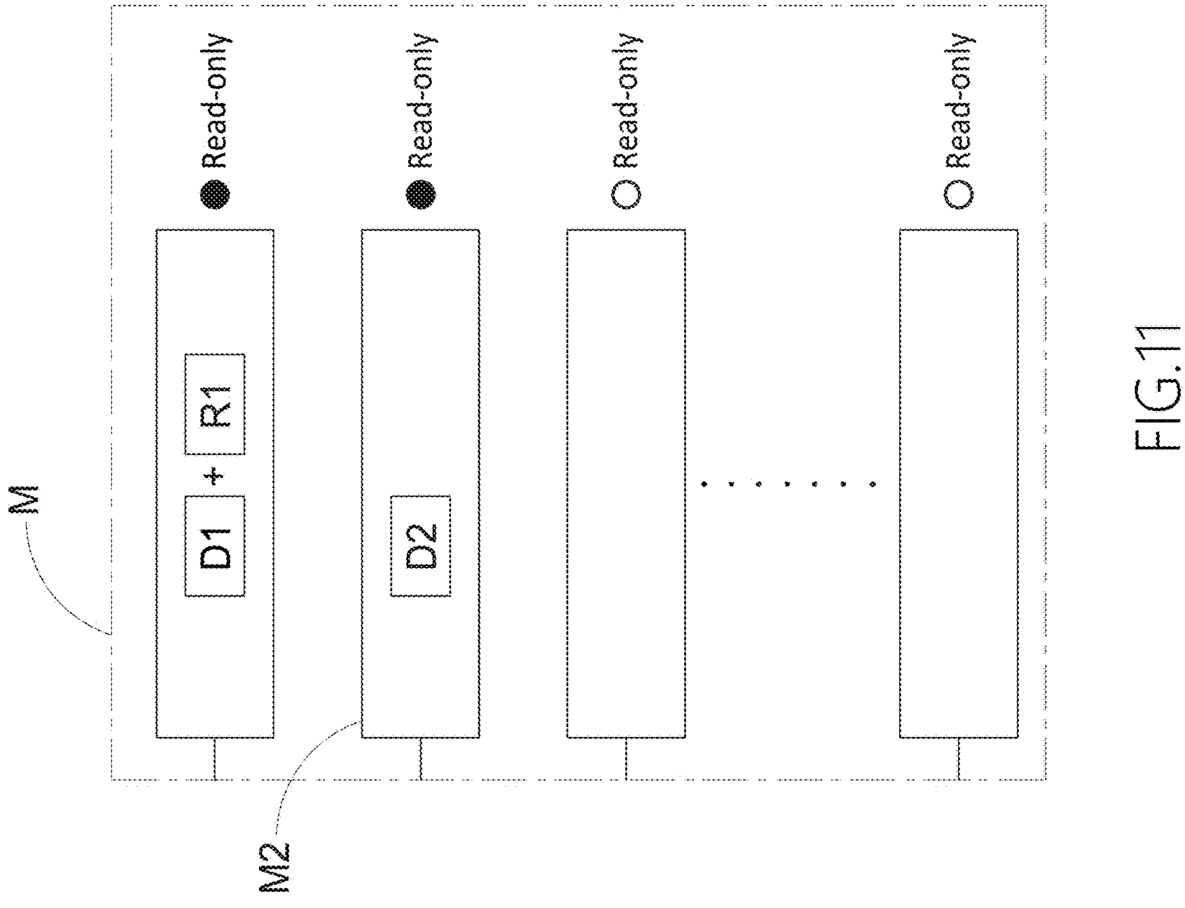
FIG. 11 is a diagram of another preferred embodiment (3) according to the present disclosure.

Following the above, referring to FIGS. 10 and 11, when the editing and uploading process S4 for the new content is performed, operations are as follows:

(1) A data storage area-selecting operation S41: Mainly, the second user-end information device 14 selects a data storage area (one of the data storage areas from the second data storage area M2 to the nth data storage area Mn, for example, the second data storage area M2 in FIG. 11) in the file M to store the digital content D2.

(2) A content-editing operation S42: The digital content D2 is edited in the selected data storage area. For example, an advertisement text content is written. Alternatively, the digital content D2 can be pre-edited on another information device and then uploaded to the selected data storage area, for example, an audiovisual media file, but the present disclosure is not limited thereto.

(3) A storing operation S43: After setting a relevant authorization content, the digital content D2 is stored in the second data storage area M2.

(4) A read-only setting operation S44: Referring to FIG. 11, the digital content D2 can be further set as read-only.

(5) Following the above operations, a password-setting operation S441 can be further performed to restrict access so that only one who has the password is allowed to open the digital content D2 (and the digital content D1).

(6) The NFC tag 13 corresponding to the digital content D1 and the digital content D2 which has been written is combined with a physical object (such as a gift G illustrated in FIG. 9) which is placed into circulation for sale in the market.

Figure 12:
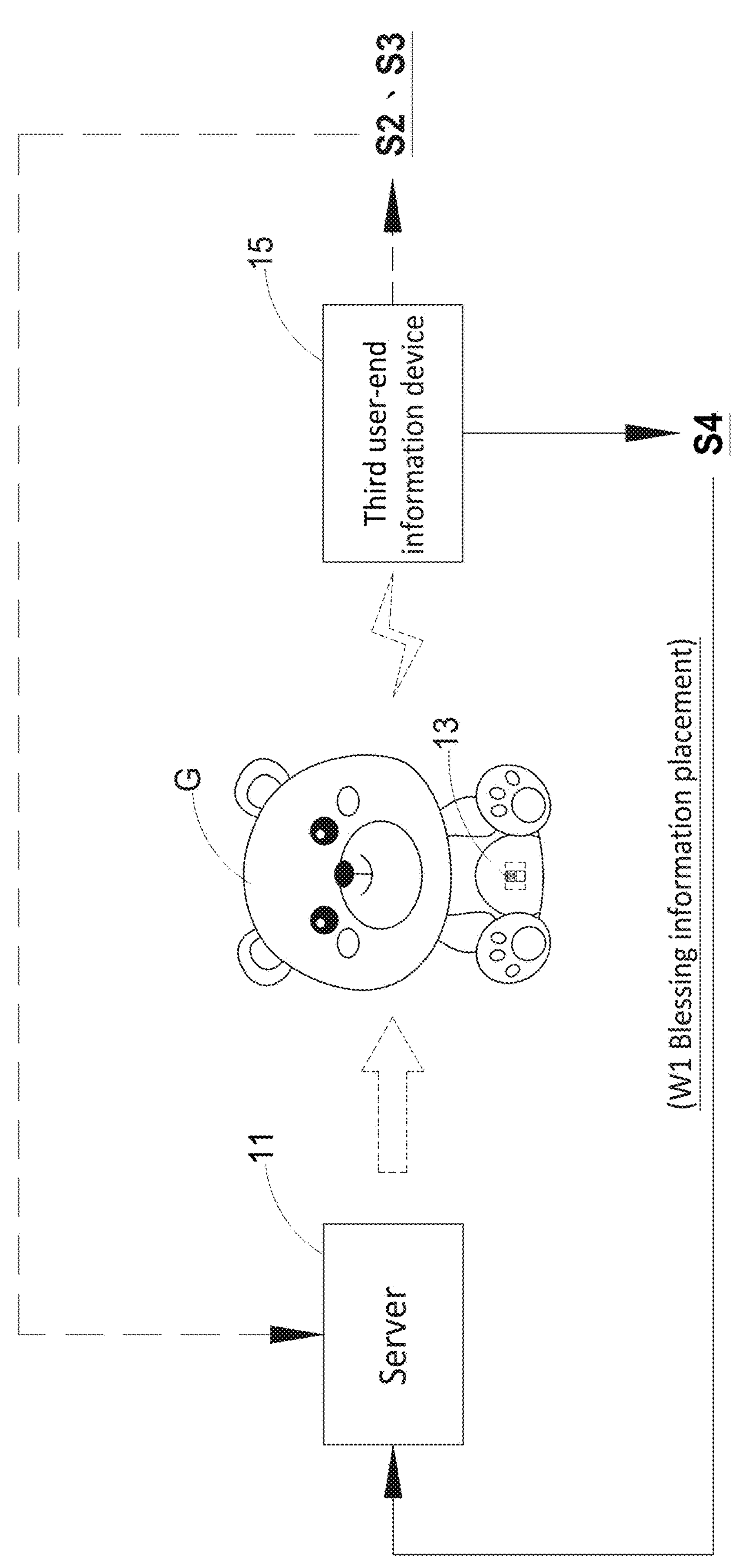
FIG. 12 is a diagram of another preferred embodiment (4) according to the present disclosure.

Referring to FIG. 12, after an end consumer purchases the gift G which is intended to be given to a recipient, the end consumer uses a third user-end information device 15 held by the end consumer to sense the NFC tag 13 attached to the gift G, and completes the identification and verification process S2 and the authorization process S3. Then, the end consumer uses the third user-end information device 15 to perform the editing and uploading process S4 for a new content. Furthermore, the end consumer can operate the third user-end information device 15 to edit a blessing information W1, which can, for example, be blessing text, recorded blessing voice, or recorded blessing audiovisual media. After the editing and uploading process S4 (S41-S44 and S441) for the new content is completed, the end consumer gives the gift G to the recipient.

Figure 13:
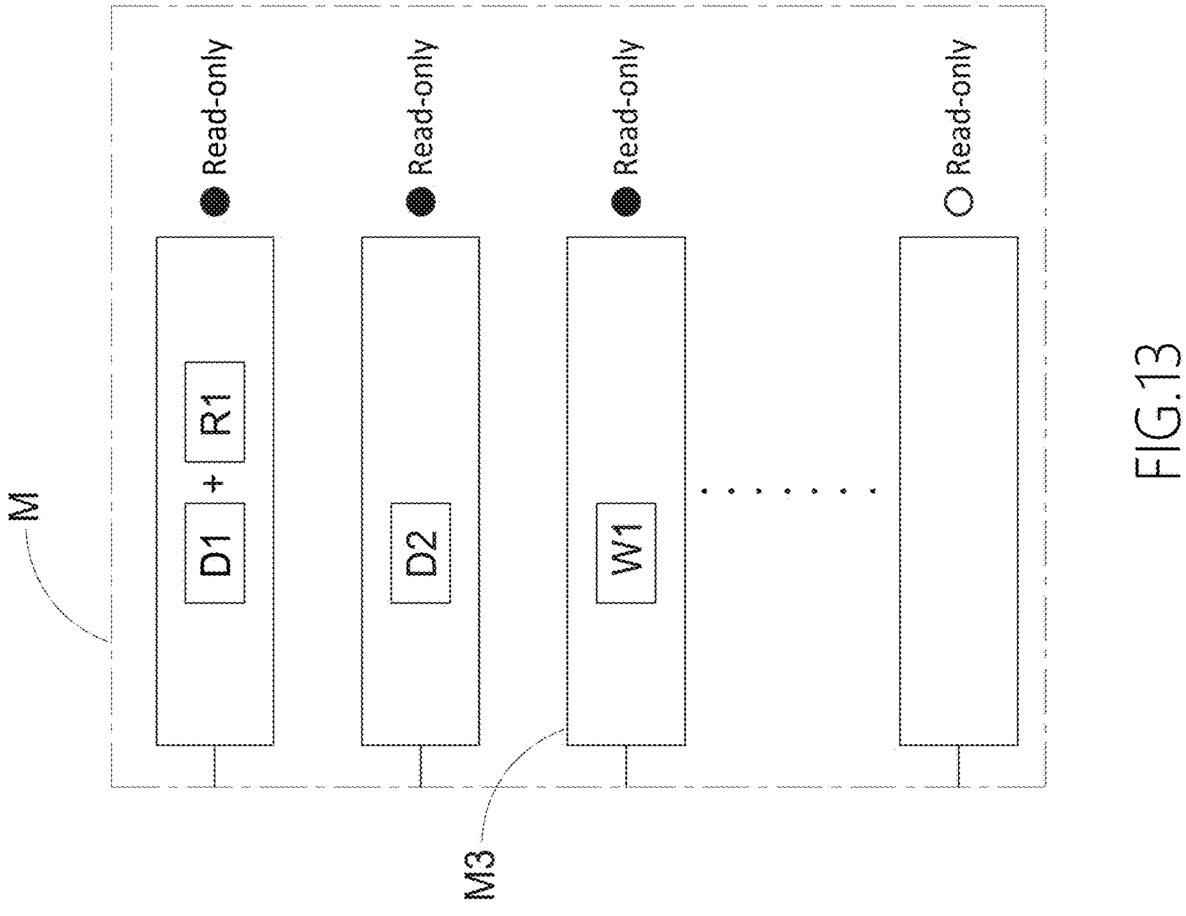
FIG. 13 is a diagram of another preferred embodiment (5) according to the present disclosure.

Referring to FIG. 13, during the editing and uploading process S4 for the new content, the third user-end information device 15 can store the edited or recorded blessing information W1 in the third data storage area M3, and can further perform the password-setting operation S441 (refer to FIG. 10) to restrict access so that only a recipient who has the password is allowed to open the digital content D2, the digital content D1, and the blessing information W1.

Figure 14:
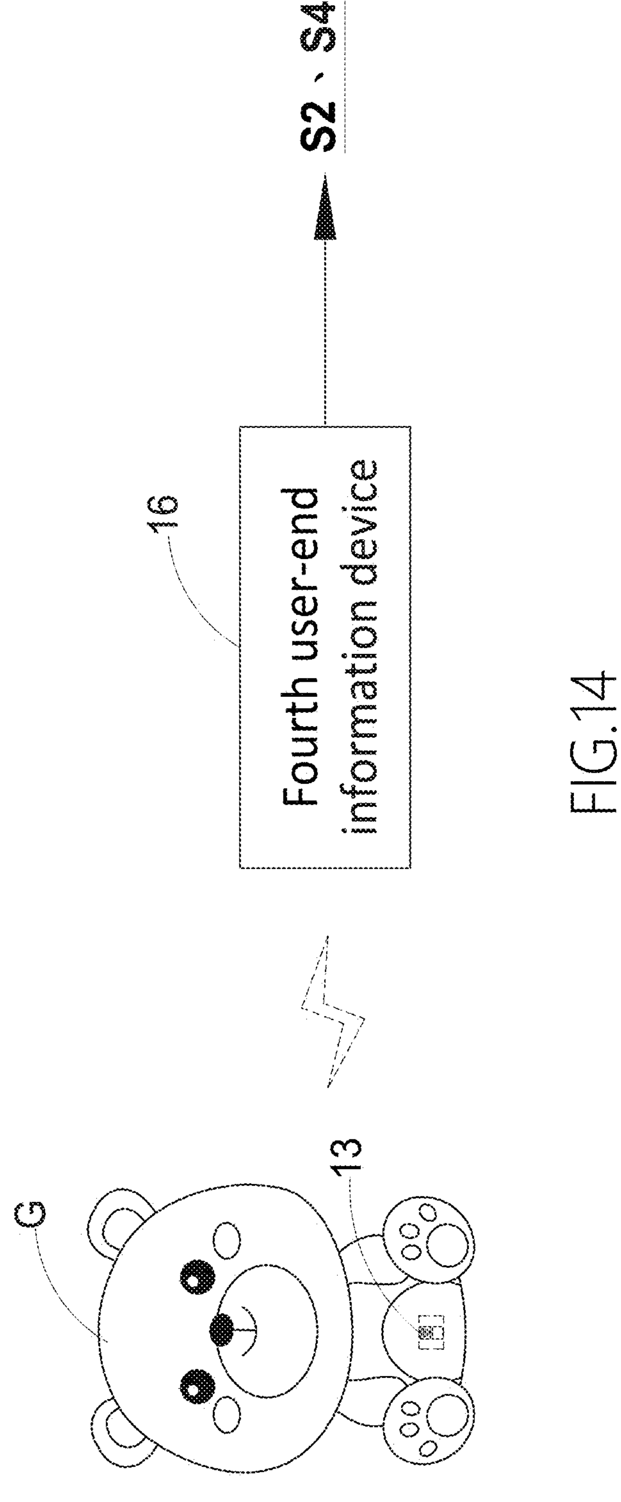
FIG. 14 is a diagram of another preferred embodiment (6) according to the present disclosure.
Figure 15:
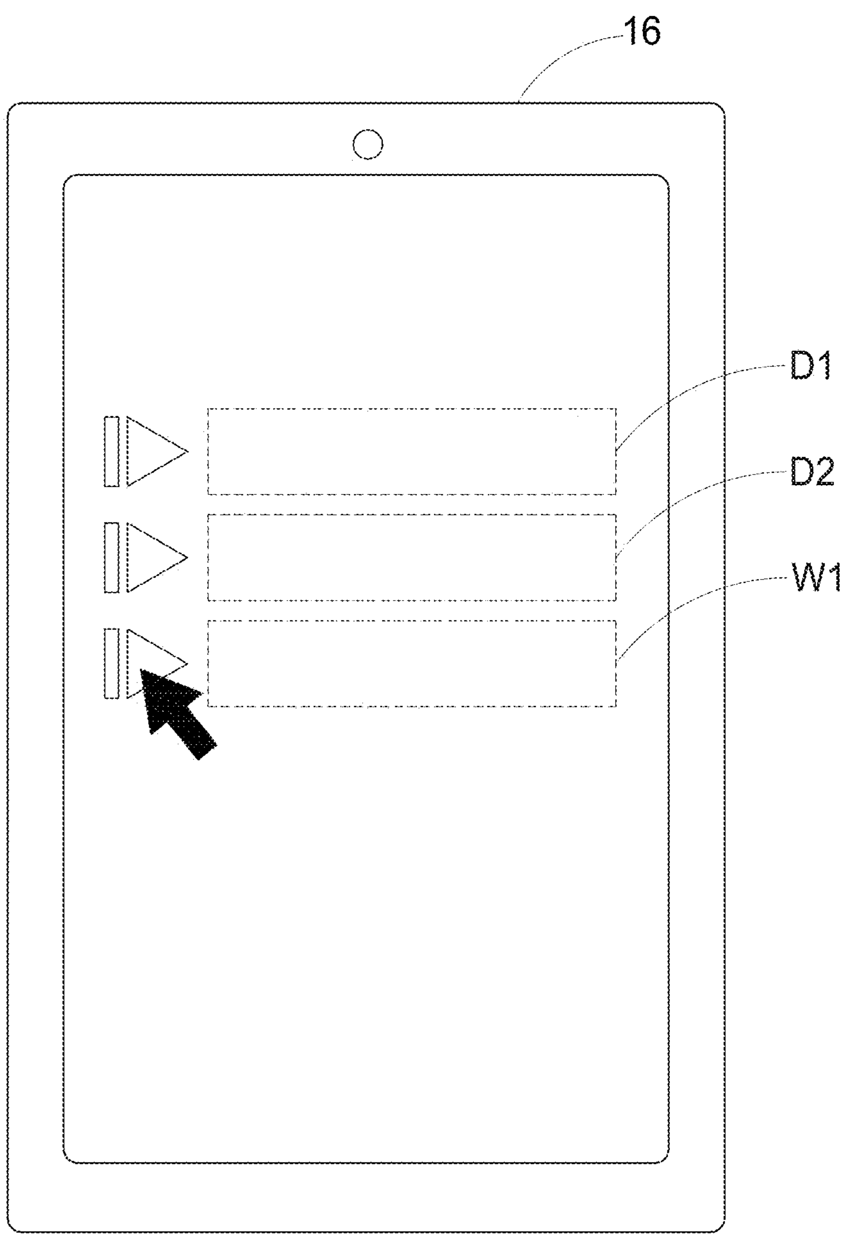
FIG. 15 is a diagram of another preferred embodiment (7) according to the present disclosure.

Referring to FIG. 14, when the recipient receives the gift G, the recipient can use a fourth user-end information device 16 held by the recipient to sense the NFC tag 13 attached to the gift G and complete the identification and verification process S2, and the authorization process S3. Then, the recipient can use the fourth user-end information device 16 to selectively read the digital content D1, the digital content D2, and the blessing information W1 (refer to FIG. 15).

As mentioned above, a digital content authorization management system and a method for using for using the same of the present disclosure mainly involves enabling a digital content to be stored on a server for management after establishing an "authorization rule". Correspondingly, an authorization code is generated for the digital content, along with an identification code corresponding to the authorization code. The identification code is for an NFC tag circulated in an external market to be sensed by a user-end information device to, after the identification code is corresponded to the authorization code and the authorization rule, obtain a right to read the digital content. In this way, a legally authorized use of the digital content can be effectively managed. The controlled digital content can also be combined with, for example, a gift, and other digital contents can be further added to enhance overall utility and circulation. In summary, the present disclosure, upon implementation, can indeed achieve an object of providing a digital content authorization management system and a method for using the same, which use NFC technology to manage an authorized digital content through an authorization rule and an authorization code. A user is required to undergo identification and verification prior to reading the digital content. After the identification and verification are completed, the legally authorized digital content can be read and used. Other users are allowed to differentiate and store a plurality of digital contents with different attributes.

The above is only the preferred embodiments of the present disclosure, and is not intended to limit the present disclosure to the forms disclosed. Any modifications, equivalent alternatives, and improvements made within the spirit and the scope of present disclosure by persons skilled in the art should be included in the scope of claims of the present disclosure.

REFERENCE NUMERALS IN DRAWINGS

1 a digital content authorization
11 a server
111 a central processing unit (CPU)
112 an authorization code management module
1121 an identification code list
1122 an authorization code list
1123 an authorization information list
113 a digital content database
114 an authorization verification module
12 a first user-end information device
13 a near-field communication tag
14 a second user-end information device
15 a third user-end information device
16 a fourth user-end information device
S1 a content-uploading process
S11 a digital content-uploading operation
S12 an authorization rule-establishing operation
S13 an authorization code-generating operation
S14 an identification code-pairing operation
S15 an authorization code and identification code-storing operation
S2 an identification and verification process
S21 an identification code-receiving operation
S22 an authorization rule verification operation
S23 an authorization code-obtaining operation
Y correct
N Incorrect
S3 an authorization process
S31 a playback permission-granting operation
S32 a media information playback operation
S4 an editing and uploading process for a new content
S41 a data storage area-selecting operation
S42 a content-editing operation
S43 a storing operation
S44 a read-only setting operation
S441 a password
C an authorization code
D1 a digital content
G a gift
ID1 an identification code
R1 an authorization rule
M a file
M1 an original authorization data storage area
M2 a second data storage area
M3 a third data storage area
Mn an nth data storage area
W1 a blessing information

What is claimed is:

1. A digital content authorization management system, configured to control a playback permission of a digital content, wherein the system comprises:

a server having a central processing unit (CPU) capable of performing logical operations, wherein the CPU is informationally connected to an authorization code management module, a digital content database, and an authorization verification module, wherein the authorization code management module stores an identification code list, an authorization code list, and an authorization information list, and wherein a plurality of identification codes are recorded in the identification code list, a plurality of authorization codes are recorded in the authorization code list, and a plurality of authorization rules are recorded in the authorization information list;

the digital content database informationally connected to the CPU and storing a plurality of digital contents;

the authorization verification module informationally connected to the CPU and configured to verify validity for one of the authorization rules and one of the authorization codes, and grant a playback permission for one of the digital contents when a verification result is valid;

a first user-end information device configured to edit the one of the digital contents and transmit the one of the digital contents to the server after the editing is completed;

wherein when the one of the digital contents is transmitted to the server for storage, an authorization rule is defined for the one of the digital contents, and the authorization management module generates an authorization code, creates a package comprising the one of the digital contents and the authorization rule and associates the package informationally with the authorization code, and pairs the authorization code with an identification code corresponding to a near-field communication (NFC) tag, wherein, after the pairing is completed, the one of the digital contents is stored in the digital content database, the authorization code is stored in the authorization code list, the identification code is stored in the identification code list, and the authorization rule is stored in the authorization information list; and when a second user-end information device attempts to read the one of the digital contents, the second user-end information device activates a near-field sensing mode to sense the NFC tag, and then enters an identification and verification process and an authorization process, and obtains the playback permission for the one of the digital contents to view the one of the digital contents through playback.

2. The digital content authorization management system of claim 1, wherein the one of the digital contents and the corresponding authorization code are stored in the digital content database in a form of a file, and the file has at least an original authorization data storage area, a second data storage area, and a third data storage area.

3. The digital content authorization management system of claim 2, wherein, after the second user-end information device reads the NFC tag through near-field sensing and passes the identification and verification process, the second user-end information device performs, on the file, an editing and uploading process for a new content to write another new digital content, wherein the another new digital content is stored in the second data storage area, wherein the another new digital content is an advertisement for a service content, and wherein the advertisement is any one of the following or a combination thereof: text, image, or audiovisual media.

4. The digital content authorization management system of claim 3, wherein the NFC tag is combined with a physical object, wherein, after a third user-end information device senses the NFC tag combined with the physical object and completes the identification and verification process and the authorization process, the third user-end information device performs an editing and uploading process for another new content, wherein the another new content is stored in the second data storage area, and wherein the another new content is any one of the following or a combination thereof: blessing text, blessing voice, or blessing audiovisual media.

5. The digital content authorization management system of claim 4, wherein, after a fourth user-end information device senses the NFC tag attached to the physical object, and completes the identification and verification process and the authorization process, the fourth user-end information device is allowed to selectively read the digital contents stored in the original authorization data storage area, the second data storage area, and the third data storage area, respectively.

6. A method for using a digital content authorization management system to control a playback permission of a digital content after a first user-end information device uploads the digital content to a server, wherein the method comprises:

an authorization rule-establishing operation for defining an authorization rule for the digital content via an operation interface;

an authorization code-generating operation for, after the definition of the authorization rule is completed, generating, by an authorization management module of the server, an authorization code, creating, by the authorization management module, a package comprising the digital content and the authorization rule and associating, by the authorization management module, the package informationally with the authorization code;

an identification code-pairing operation for, following a previous operation, pairing, by the server, the authorization code with a near-field communication (NFC) tag having an identification code which is unique, wherein after the pairing is completed, the digital content is stored in a digital content database informationally connected to the server, the authorization code is stored in an authorization code list informationally connected to the server, and the NFC tag is released for use;

an authorization code and identification code-storing operation for, following a previous operation, storing the identification code which has been paired in an identification code list informationally connected to the server and storing the authorization rule in an authorization information list informationally connected to the server; and wherein upon completion of the above operations, the digital content is assigned a file name and then stored as a file in the digital content database informationally connected to the server.

7. The method for using the digital content authorization management system of claim 6, wherein the authorization rule is any one of the following or a combination thereof: a user account, an authorization period, or an authorized type of use.

8. The method for using the digital content authorization management system of claim 7, wherein the authorized type of use is any one of the following or a combination thereof: reading, reproduction, modification, or read-only access.

9. The method for using the digital content authorization management system of claim 6, wherein, when another user intends to read the digital content, the another user causes a second user-end information device to activate a near-field sensing mode and then sense the NFC tag to read the identification code of the NFC tag, upload the identification code to the sever, and enter an identification and verification process, wherein the identification and verification process comprises:

an authorization rule verification operation for, after the server receives the identification code, using, by the server, the identification code as a basis to check whether the identification code is pre-registered and stored in the identification code list, and if so, further performing, by the server, verification for the authorization rule;

an authorization code-obtaining operation for, when a verification result for the authorization rule is "Y", searching for and retrieving, by the server, the authorization code corresponding to the identification code from the authorization code list, and entering, by the server, an authorization process; and wherein, after the authorization code-obtaining operation is completed, the authorization process is initiated, and the server grants a "playback permission", allowing the second user-end information device to perform a media information playback operation on the digital content.

10. The method for using the digital content authorization management system of claim 9, wherein, after the second user-end information device passes the identification and verification process, the second user-end information device performs, on the corresponding file, an editing and uploading process for another new content to write a new digital content.

11. The method for using the digital content authorization management system of claim 10, wherein, when the editing and uploading process for the new content is performed, operations performed comprise:

a data storage area-selecting operation for selecting, by the second user-end information device, a second data storage area in the file;

a content-editing operation for editing the new digital content in the selected second data storage area;

a storing operation for, after setting an authorization content, storing the new digital content in the second data storage area;

a read-only setting operation for further setting the new digital content as read-only; and a password-setting operation for restricting access so that only one who has the password is allowed to open the new digital content and the digital content.

12. The method for using the digital content authorization management system of claim 11, wherein, after a third user-end information device senses the NFC tag and completes the identification and verification process and the authorization process, the third user-end information device performs an editing and uploading process for a new content to write a blessing information, and wherein the blessing information is stored in a third data storage area, and a password is further set.

13. The method for using the digital content authorization management system of claim 12, wherein, after a fourth user-end information device senses the NFC tag and completes the identification and verification process and the authorization process, the fourth user-end information device is allowed to selectively read the digital content, the new digital content, and the blessing information.

* * * * *